(12) United States Patent
Hercules

(10) Patent No.: US 11,196,700 B1
(45) Date of Patent: Dec. 7, 2021

(54) SINGLE-USER NON-TRANSFERRABLE COMMUNICATION CLIENT FOR PUBLIC COMMUNICATION NETWORKS

(71) Applicant: Jesse Hercules, Memphis, TN (US)

(72) Inventor: Jesse Hercules, Memphis, TN (US)

(73) Assignee: ContactLink Corporation, Memphis, TN (US)

( * ) Notice: Subject to any disclaimer, the term of this patent is extended or adjusted under 35 U.S.C. 154(b) by 0 days.

(21) Appl. No.: 16/951,622

(22) Filed: Nov. 18, 2020

Related U.S. Application Data

(60) Provisional application No. 63/045,521, filed on Jun. 29, 2020.

(51) Int. Cl.
*H04L 12/58* (2006.01)
*H04L 29/08* (2006.01)
*H04W 4/14* (2009.01)

(52) U.S. Cl.
CPC .............. *H04L 51/36* (2013.01); *H04L 51/12* (2013.01); *H04L 67/02* (2013.01); *H04L 67/306* (2013.01); *H04W 4/14* (2013.01)

(58) Field of Classification Search
CPC ....... H04L 51/36; H04L 67/306; H04L 51/12; H04L 67/02; H04W 4/14
See application file for complete search history.

(56) References Cited

U.S. PATENT DOCUMENTS

| | | | |
|---|---|---|---|
| 8,150,416 B2 | 4/2012 | Ribaudo et al. | |
| 8,331,542 B2 | 12/2012 | Crausaz et al. | |
| 8,819,293 B2 | 8/2014 | Mobin et al. | |
| 2002/0112014 A1* | 8/2002 | Bennett | H04W 88/184 709/206 |
| 2003/0182383 A1* | 9/2003 | He | G06Q 10/107 709/206 |
| 2007/0248220 A1 | 10/2007 | Crandell et al. | |

(Continued)

OTHER PUBLICATIONS

Anonyome Labs, "Data Sheet: Sudo Platform", Anonyome Labs, Inc., 2019. 2 pages.

(Continued)

*Primary Examiner* — Nicholas R Taylor
*Assistant Examiner* — Tania M Pena-Santana
(74) *Attorney, Agent, or Firm* — Cooley LLP

(57) ABSTRACT

A non-transitory computer readable storage medium has instructions executed by a processor to supply prompts from a communication platform to a first machine via a network to register a first user with the communication platform. Prompts are supplied from the communication platform to the first machine via the network to the first user to specify a second user and public network communication constraints. A network address to a single-user, non-transferrable communication client that enforces the public network communication constraints is created. Prompts from the communication platform via the network are supplied to a second machine associated with the second user, allowing the second user to send a second user message through the single-user, non-transferrable communication client. The second user message is sent to the first user via a selected public network allowed by the single-user, non-transferrable communication client.

10 Claims, 13 Drawing Sheets

(56) References Cited

U.S. PATENT DOCUMENTS

| | | | | |
|---|---|---|---|---|
| 2008/0292080 | A1* | 11/2008 | Quon | G06Q 10/109 |
| | | | | 379/201.02 |
| 2015/0058939 | A1* | 2/2015 | Duong | H04L 63/0421 |
| | | | | 726/5 |
| 2015/0067842 | A1* | 3/2015 | Stibel | H04L 63/1441 |
| | | | | 726/22 |
| 2015/0215302 | A1* | 7/2015 | Parthasarathy | H04L 63/0227 |
| | | | | 726/3 |
| 2015/0295726 | A1* | 10/2015 | Bland | H04L 12/189 |
| | | | | 709/203 |
| 2018/0048618 | A1* | 2/2018 | Fletcher | G06Q 10/107 |

OTHER PUBLICATIONS

"How We Protect Your Real Number", [online], BurnerApp.com, 2019 [retrieved on Sep. 2, 2021], Retrieved from the internet: <URL: https://support.burnerapp.com/article/24-how-we-protect-your-real-number>. 1 page.

"Intuitive, Secure, and Reliable Business Text Messaging", [online], HeyMarket, 2019 [retrieved on Sep. 2, 2021], Retrieved from the internet: <URL: https://www.heymarket.com/product/>. 14 pages.

"Masqt: Your Digital Shield", [online], Masqt, 2019 [retrieved on Sep. 2, 2021], Retrieved from the internet: <URL: https://masgt.com/>. 2 pages.

"Norton Privacy Manager iOS", [online], Norton LifeLock, 2019 [retrieved on Sep. 2, 2021], Retrieved from the internet: <URL: https://support.norton.com/sp/en/US/norton-privacv-manaaer-for-ios/current/info>. 2 pages.

Perez, S. "Shuffle's New iPhone App Lets You Create Disposable Phone Numbers . . . And Emails, Too", [online], TechCrunch. May 15, 2015. [retrieved on Sep. 2, 2021], Retrieved from the internet: <URL: https://techcrunch.com/2015/05/15/shuffles-new-iphone-app-lets-you-create-disposable-phone-numbers-and-emails-too/>.

"Privacy is Progress", [online], Anonyome Labs, Inc., 2019 [retrieved on Sep. 2, 2021], Retrieved from the internet: <URL: https://anonyome.com/>. 6 pages.

Teelucksingh, D. A. "A new, easier way to start a Skype conversation and invite anyone to join", ICANN; Technology Taskforce. Oct. 15, 2015. Retrieved from the internet: <URL:http://mm.icann.org/pipermail/ttf/2015-October/000531.html>. 1 page.

"Welcome to DeadDrop", [online], DeadDrop, 2019 [retrieved on Sep. 2, 2021], Retrieved from the internet: <URL: https://deaddrop.herokuapp.com/>. 2 pages.

* cited by examiner

SINGLE-USER NON-TRANSFERRABLE COMMUNICATION CLIENT FOR PUBLIC COMMUNICATION NETWORKS

CROSS-REFERENCE TO RELATED APPLICATION

This application claims priority to U.S. Provisional Patent Application Ser. No. 63/045,521, filed Jun. 29, 2020, the contents of which are incorporated herein by reference.

FIELD OF THE INVENTION

This invention relates generally to communications in computer networks. More particularly, this invention is directed toward a platform supporting a single-user non-transferrable communication client for public communication networks.

BACKGROUND OF THE INVENTION

When two people want to have an ongoing, remote conversation they typically exchange contact addresses on one or more of the open, publicly available communication networks (e.g., a packet-switched telephone network, a Short Message Service (SMS) text network or an email network). For example, they might exchange phone numbers to enable future conversation by phone call or text message. Or they might exchange email addresses to enable future conversation by email.

The first person inputs the second person's contact addresses into communication clients that the first person controls. For example, the first person might input the second person's email address into a Microsoft Outlook® email client controlled by the first person. Or the first person could input the second person's phone number into the phone call app or text message app on a smartphone controlled by the first person.

The second person inputs the first person's contact addresses into communication clients that the second person controls. Thus, the sender of a message or initiator of a call is the one who controls the client software or device used to send the message or initiate the call. The contact address of one person is entered into a communication client controlled by the other person.

This approach causes problems. Once the second person has the first person's contact address, they can misuse it by sending unwanted communications. If the first person instructs the second person not to send or initiate further communications, the second person can send or initiate further unwanted communications. The second person can also transfer or sell the contact address to others, who can send unwanted communications or transfer it further. This results in a large amount of unwanted calls, SPAM and unwanted emails, and unwanted text messages.

The current state of the art includes several attempts to solve misuse and transfer of contact addresses.

Using software to filter incoming communications: Some communication clients use software to filter out unwanted communications by sender address while allowing other communications to be received. For example, there are known techniques for blocking emails from a certain address or phone calls from a certain number. This is problematic because an unwanted communicator can use a new and different address for each unwanted call or message, to defeat these kinds of filters.

Changing Email Addresses or Phone Numbers: Another approach is to delete an email address that is receiving unwanted messages, and switch to a new one. Or to change away from a phone number that is receiving unwanted calls or text messages to a new phone number.

This is problematic, because a first person's contact info is stored in many other people's contact databases, many of whom the first person wants to keep communicating with. The first person does not have and cannot obtain a list of all the places their contact information is stored; and they have no ability to update the information in other people's records.

Because of these problems, the first person typically is able to notify some others of the new contact addresses, but is not able to notify everyone he would like to keep in contact with. Also, some of those notified will fail to replace the old contact address with the new contact address in their records.

For these reasons, changing email addresses or phone numbers usually results in losing contact with others that the first person would like to stay in contact with.

Create "Burner" or "Masked" email address and phone numbers: Products are available to let a first person create new phone numbers or email addresses to give to others that they don't fully trust. These phone numbers or email addresses can be cancelled later with less disruption to the first person's regular communications. However, these phone numbers and email addresses are still subject to misuse and transfer, just like any phone number or email address.

These phone numbers and email addresses can be given to multiple recipients, so cancelling the phone number or email will affect more than one recipient's ability to contact the first person. If a first person wants to upgrade a second person's access (such as letting the second person email the first person's primary email or call the first person's primary phone), the first person has to give the second person the new contact addresses, which adds effort, creates the possibility of mistakes, and cannot be undone.

Private Communication Networks: Private communication networks such as Facebook's Messenger® and LinkedIn's InMail® allow participants to send and receive messages on those private networks. Some of these networks have ways for a user to block another user from sending further communications.

But the private networks don't allow participants to send and receive messages on the open, public networks such as email, text messages and phone calls. There are strong advantages to the open, public networks because they are already used and understood by almost everyone.

Thus, there is a need for improved techniques for controlling messaging access to a user of a networked device.

SUMMARY OF THE INVENTION

A non-transitory computer readable storage medium has instructions executed by a processor to supply prompts from a communication platform to a first machine via a network to register a first user with the communication platform. Prompts are supplied from the communication platform to the first machine via the network to the first user to specify a second user and public network communication constraints. A network address to a single-user, non-transferrable communication client that enforces the public network communication constraints is created. Prompts from the communication platform via the network are supplied to a second machine associated with the second user, allowing the second user to send a second user message through the single-user, non-transferrable communication client. The second user message is sent to the first user via a selected public network allowed by the single-user, non-transferrable communication client.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
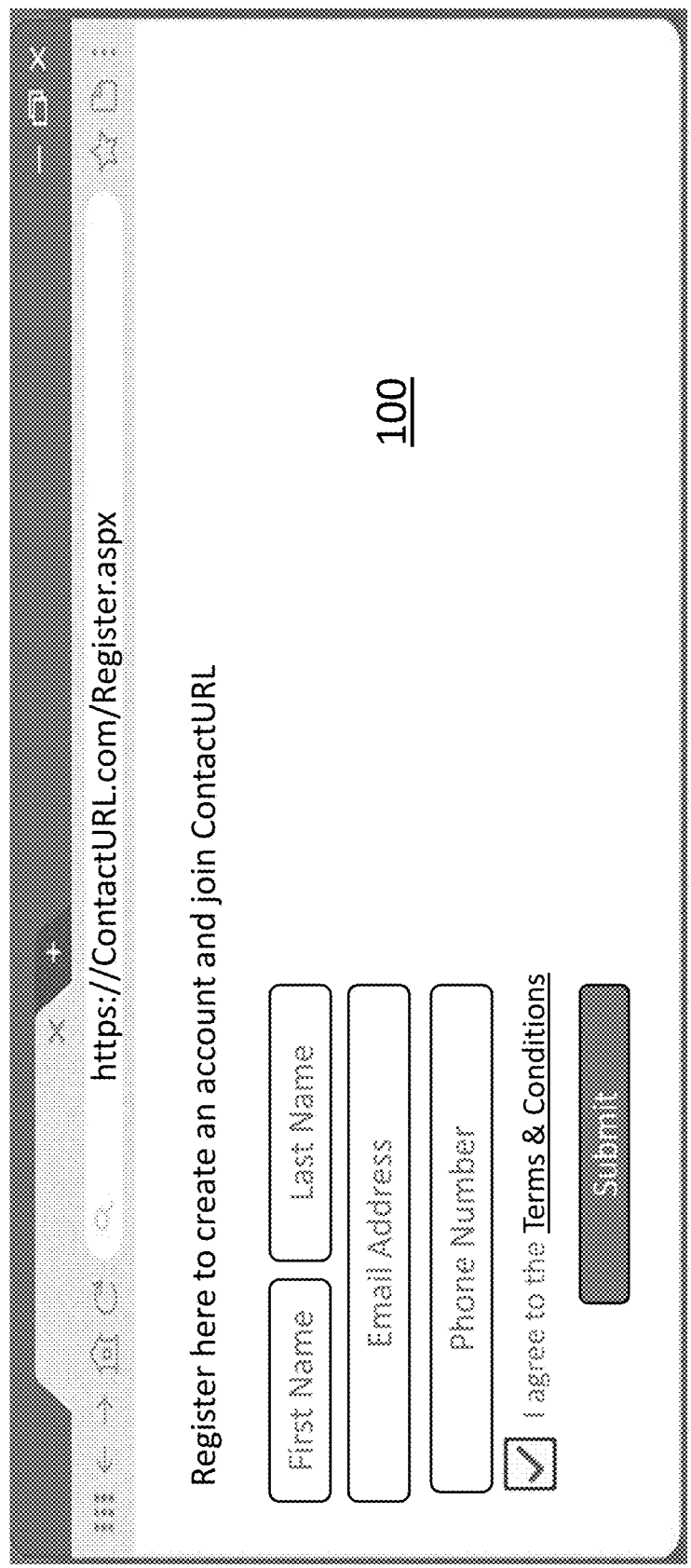
FIG. 1 illustrates an interface to prompt a user to register with a platform disclosed herein.

The disclosed technology allows a first user (e.g., a platform user) to give a second person (e.g., a platform guest) access to a single-user, non-transferrable communication client that stores the first person's contact addresses and lets the second person send email, phone calls, and text messages to the first person. The first person controls the configuration of this communication client, allowing the first person at any time to limit or stop further communications from the second person. The second person never receives the first person's contact addresses and therefore cannot transfer or misuse them.

In one embodiment, a thin client is available over the internet through a standard internet browser, at a standard network address, web address or Uniform Resource Locator (URL). This thin client is available only to the second person who was invited to the network address by the first person; others are not able to use it.

The disclosed technology also allows the second person to input contact addresses into the communication client. Thus, the system is an intermediary that stores the contact information of both parties, but does not disclose either party's contact addresses to the other.

The first person is given access to an additional single-user, non-transferrable communication client, which allows the first person to communicate with the second person. The second person controls the configuration of the client available to the first person, allowing the second person to limit or cut off communications by the first person. This client is only available to the first person, it cannot be accessed or used by others.

In one embodiment, the first person uses a thin client made available over the internet through a standard internet browser, at a standard network address, web address or URL. This thin client is available to the first person when they are securely logged into the website; others are not able to use it.

In another embodiment, the first person uses a client application running on a mobile smartphone, tablet or personal computer. The client application interfaces with a web application running in the cloud, for example a .Net application running on Microsoft Azure®. The client application uses an API to send the content of a message (for example, an email or text message) to the web application, which stores the second person's contact addresses. The web application sends the email or text message to the second person, without disclosing the second person's addresses to the first person. The second person can control the web application via a thin client or a desktop/mobile client and can configure the web application to stop sending messages or connecting calls from the first person. The second person can also supply configuration information to the web application, which is downloaded and used by the first person's client application running on the smartphone, tablet or computer. For example, the client application running on the first person's smartphone might disallow composing or attempting to send an email to a second person based on a configuration set by the second person.

Thus, the first person uses a local client in combination with a web application to achieve the same result as the thin client discussed above. The web application acts as an intermediary, allowing the recipient of a communication to control the sender's ability to send further communications.

This intermediary approach solves the problems of contact addresses. The contact addresses are stored by a trusted intermediary (i.e., the platform) rather than being disclosed to the other person. The person who receives unwanted communications can cut off any further communications from the other person. Neither party can transfer or sell the contact addresses or the ability to contact the other.

Many people want to list their contact information publicly, so others can find them and contact them. However, when they list contact addresses such as a phone number or email address on a publicly available website or in a publicly available directory, they find the addresses are misused and transferred.

The disclosed technology allows a first person to create a publicly available client that obtains the identity and reputation of a second person who wants to contact the first person. In one embodiment, the first person can create a PublicURL that allows public access to a thin client available through a standard web browser visiting a standard web address. In another embodiment, the first person can be listed in a directory that is publicly available through an App or website.

The publicly available client determines whether to give the second person access to communicate with the first person. To give such access, the publicly available client creates a single-user, non-transferrable communication client which allows the second person to communicate with the first person. A corresponding communication client is created for the first person to communicate with the second person. The communication clients operate as described above.

The publicly available client enforces a rule that only one communication client will be created for the second person to converse with the first person. Because the identity of the second person is established, the publicly available client can enforce this rule. If the first person cuts off communication with the second person, the second person is unable to re-establish communication. The publicly available client can use a variety of methods known to those skilled in the art to determine identity, including validation of communication addresses, knowledge-based authentication, and uploading a photo of a government-issued identification document.

The publicly available client uses reputation data to determine whether to issue a communication client to the second person. For example, if many other system users had flagged the second person for abuse, then the publicly available client would refuse to issue a communication client to the second person. The determination of a reputation score can use a variety of methods known to those skilled in the art, including a background check, credit score, and ratings by other users of the system.

Currently, lists of phone numbers and email addresses are used by humans and by automated systems to send large volumes of unwanted sales calls, robo-calls, robo-text messages and unwanted marketing emails. A small number of high-volume, low-value senders reduce the usefulness of the phone, text and email systems for everyone.

These senders will not be able to exploit the PublicURL thin clients to send calls or messages to large volumes of system users. After being flagged as abusive by a few system users, the reputation filter will block the high-volume senders from generating a communication client to contact additional system users.

It is more efficient to give one piece of contact information rather than several. The disclosed system allows a person to give a single invitation URL, which allows the other person to contact them by several methods, such as phone, text and email.

The system allows participants to see a history of each conversation across multiple communication methods, allowing a view of the conversation in one place and organized chronologically. This is faster and easier than going to several communication clients (email, phone, text) to piece together a conversation that occurred across several contact methods or communication channels.

The disclosed system allows people who use incompatible contact methods to communicate with each other. This is not possible with a traditional email client, text message client, or private network client such as LinkedIn® or Facebook®. A first person can give a second person access to a thin client that lets the second person compose and send emails to the first person, even though the second person does not receive emails or have an email address. The second person can give the first person access to a thin client that lets the first person send text messages to the second person, even though the first person does not receive text messages or have a phone number. Thus, an email-only first user and text-only second user can have a conversation using the disclosed system as an intermediary.

The disclosed system allows one person to distribute contact information to another person without typing mistakes and without needing a contact address to send the contact information to. The disclosed system allows a first person to show a QR Code on the first person's smartphone screen. The second person can take a picture of the QR code with the second person's smartphone. Modern smartphones convert the QR code into a URL link and allow the second person to easily and accurately follow the link with one click. The link leads to the thin communication client allowing the second person to communicate with the first person.

The invention is more fully appreciated in connection with disclosure of user interactions between a message sender, a message recipient and the disclosed system (i.e., platform). FIG. 1 illustrates an interface 100 that prompts a first user (i.e., a subscriber to the platform) to input a first name, a last name, an email address, a phone number and consent to terms and conditions of the platform.

Figure 2:
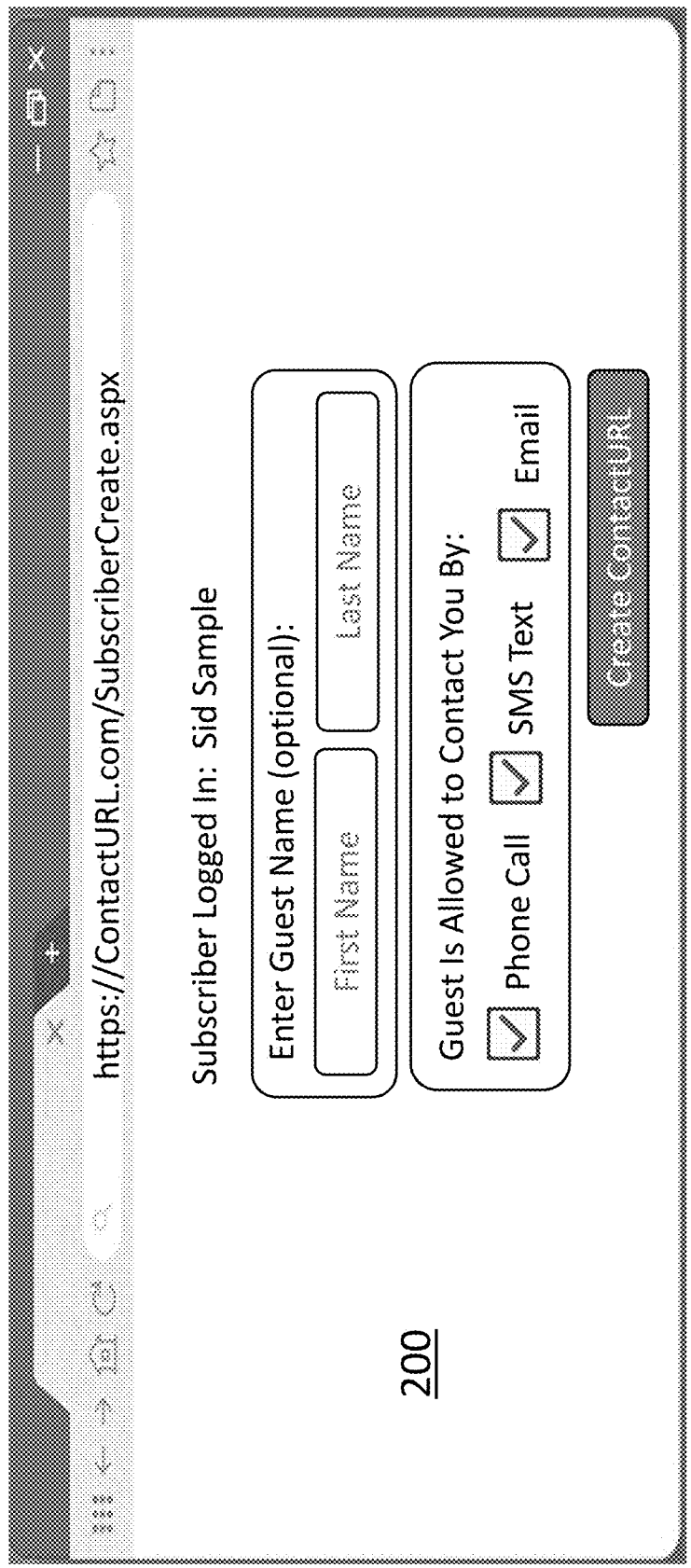
FIG. 2 illustrates an interface to prompt a user to invite a guest to communicate with the user via the platform.

FIG. 2 illustrates an interface 200 that prompts the first user to enter the first name and last name for a second user (i.e., a guest of the platform). The interface 200 also provides prompts to select different communication channels, such as packet-switched telephone network, Short Message System (SMS) text network and an email network.

Figure 3:
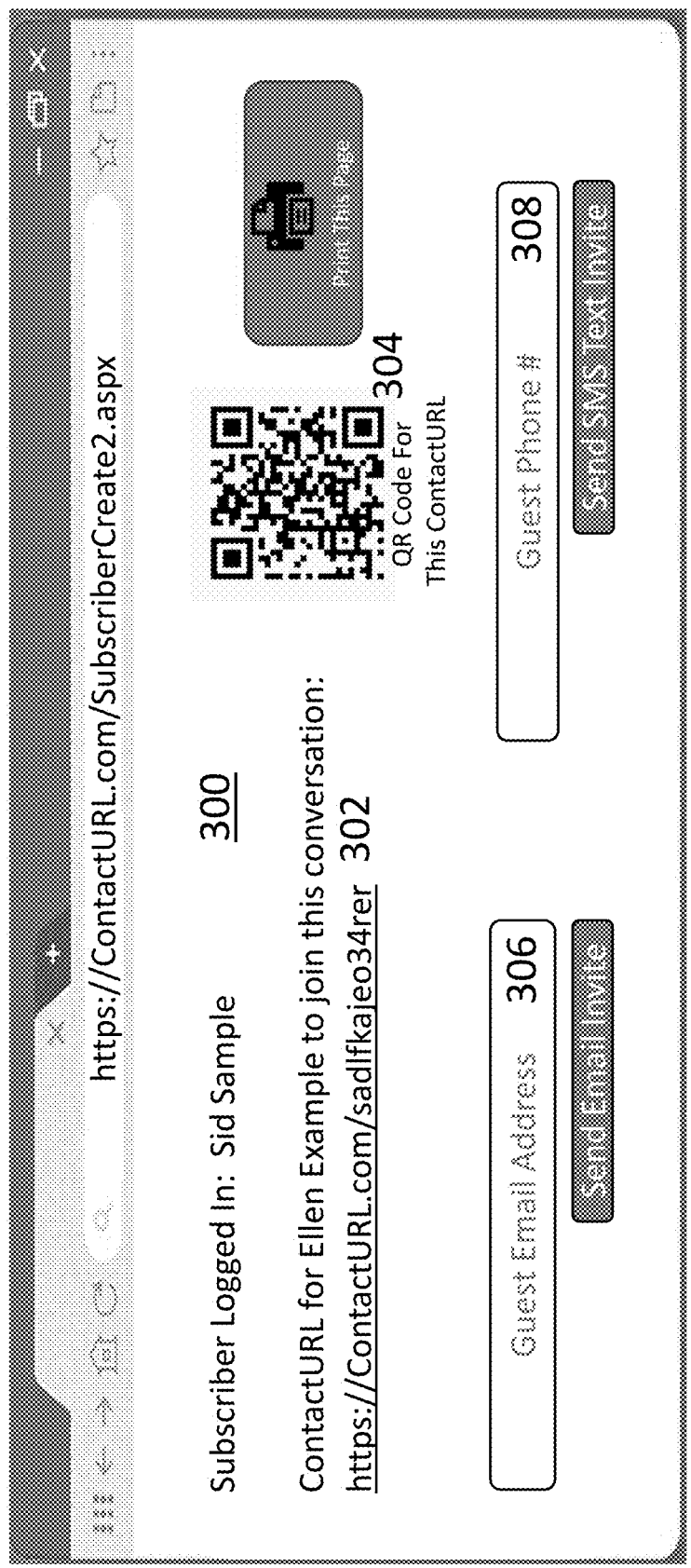
FIG. 3 illustrates an interface with a network address to communicate with the user via the platform.

FIG. 3 illustrates an interface 300 displaying a network location 302 for a single-user, non-transferrable communication client hosted by the communication platform. The interface may also display a QR code 304 corresponding to the network location. Text entry box 306 may prompt for an email address to which an invite can be sent, while text entry box 308 may prompt for a telephone number to which an SMS text can be sent. Multiple invites sent to multiple different guests will have multiple different network addresses and result in multiple different communication clients on the platform.

Invites are sent from a platform no-reply phone number or email address to avoid disclosing the subscriber's phone number and email address. Invites can also be scanned by the guest from a QR code displayed on the subscriber's computer or smartphone screen or typed in manually as a URL entered in a web browser.

Figure 4:
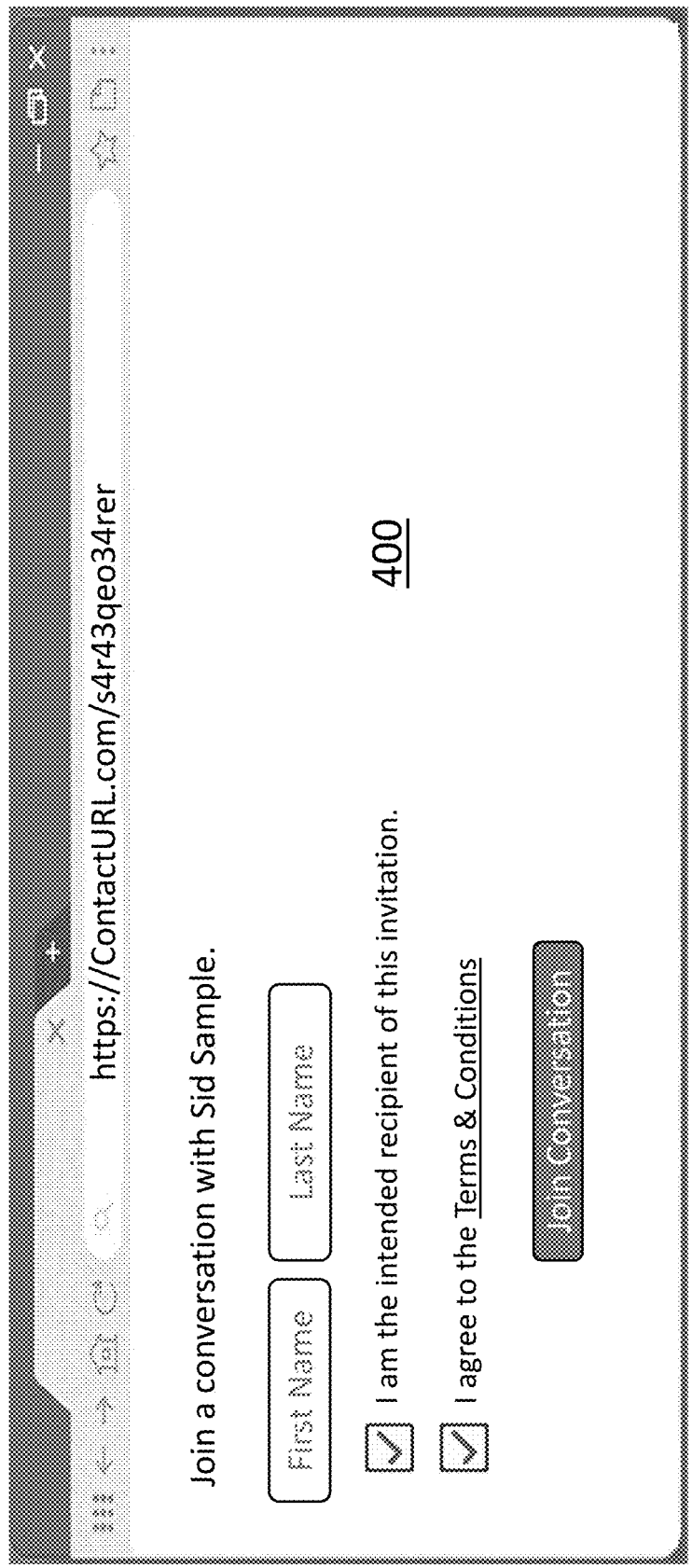
FIG. 4 illustrates an interface with prompts for a guest to identify herself and agree to terms and conditions associated with the platform.

If the user has not specified the name of the visitor, the visitor is directed to a guest landing page, such as page 400 of FIG. 4. The page 400 has prompts, such as first name and last name to identify the visitor.

Figure 5:
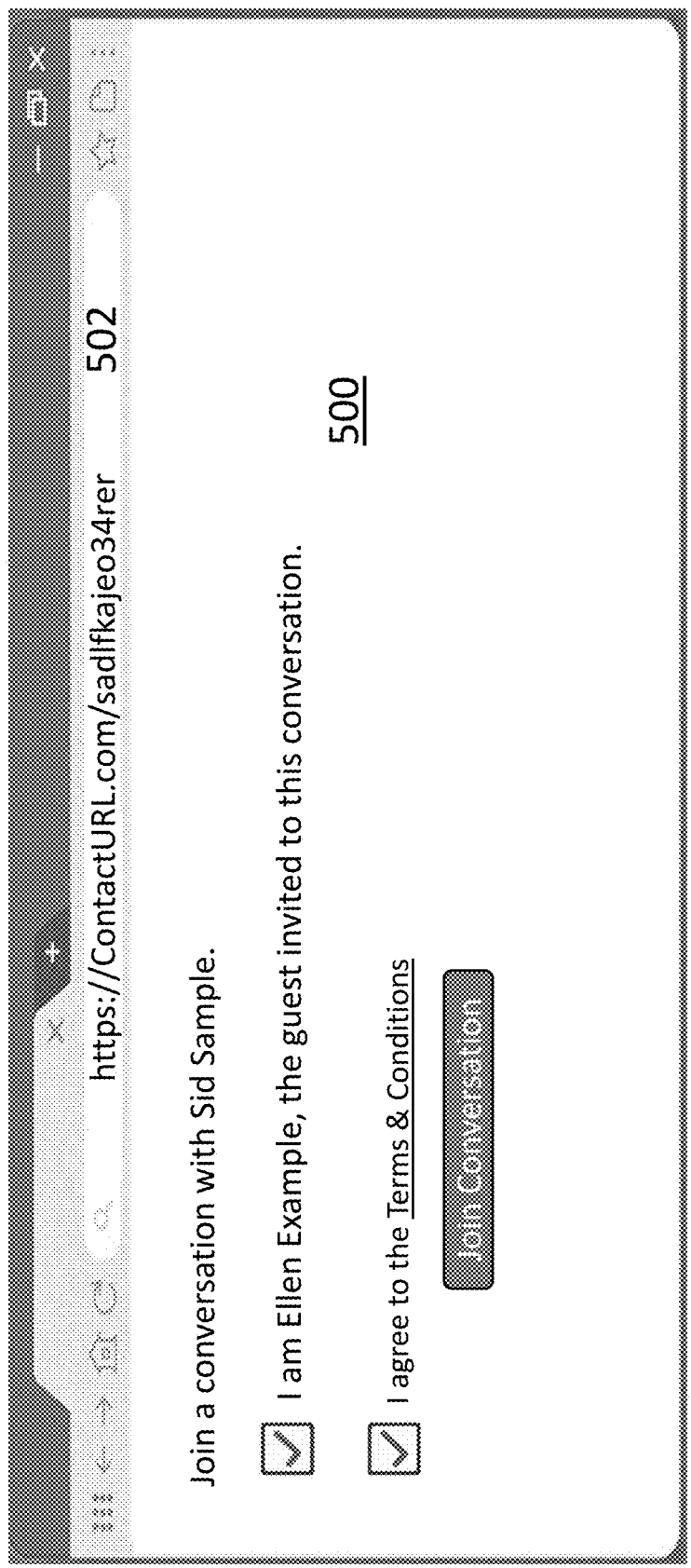
FIG. 5 illustrates an interface with prompts for an identified guest to confirm her identity and agree to terms and conditions associated with the platform.

If the guest user name is known, the guest is directed to a guest landing page, such as page 500 of FIG. 5. FIG. 5 illustrates an interface 500 that has a prompt to confirm user identity and a prompt to agree to platform Terms and Conditions, including acknowledging that the user is the intended recipient and that the user will not transfer the network address to others. The filled form is sent to the network address 502, which corresponds to network address 302 of FIG. 3.

Figure 6:
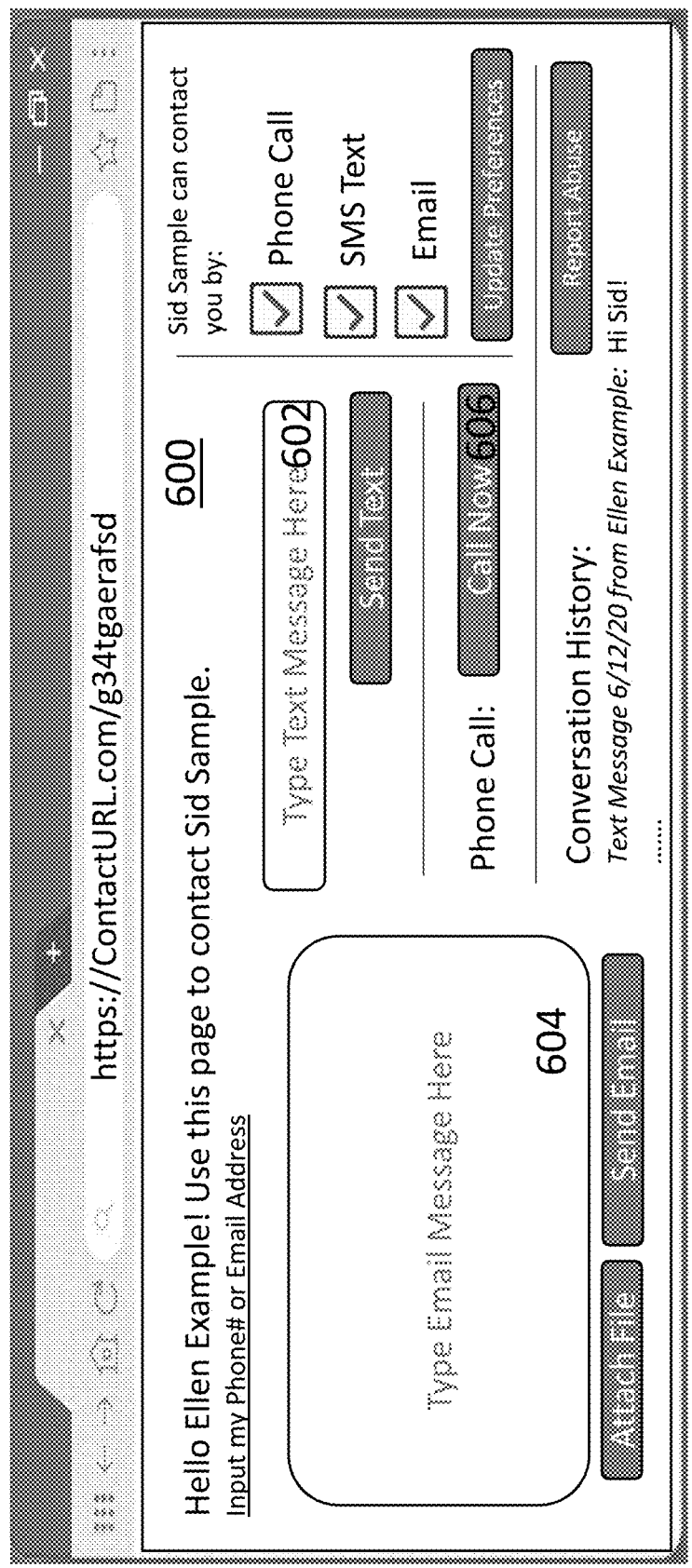
FIG. 6 illustrates a single-user, non-transferrable communication client for a guest to communicate with a user.

After establishing identity and accepting the agreement, the second user or guest is directed to a single-user thin client, with an interface 600, as shown in FIG. 6. The interface 600 facilitates communications with the first user or subscriber via phone call, text message and/or email. The thin client acts as an intermediary, holding the subscriber's contact addresses and allowing the guest to send communications without knowing the contact addresses.

On the thin client, the guest can enter a text message in block 602 and click a button to send. The SMS text message is sent from the web application (i.e., platform) to the subscriber.

The guest can compose an email in block 604 and upload any attachment(s) desired. On clicking the Send Email button, the email is sent from the web application to the subscriber.

Figure 7:
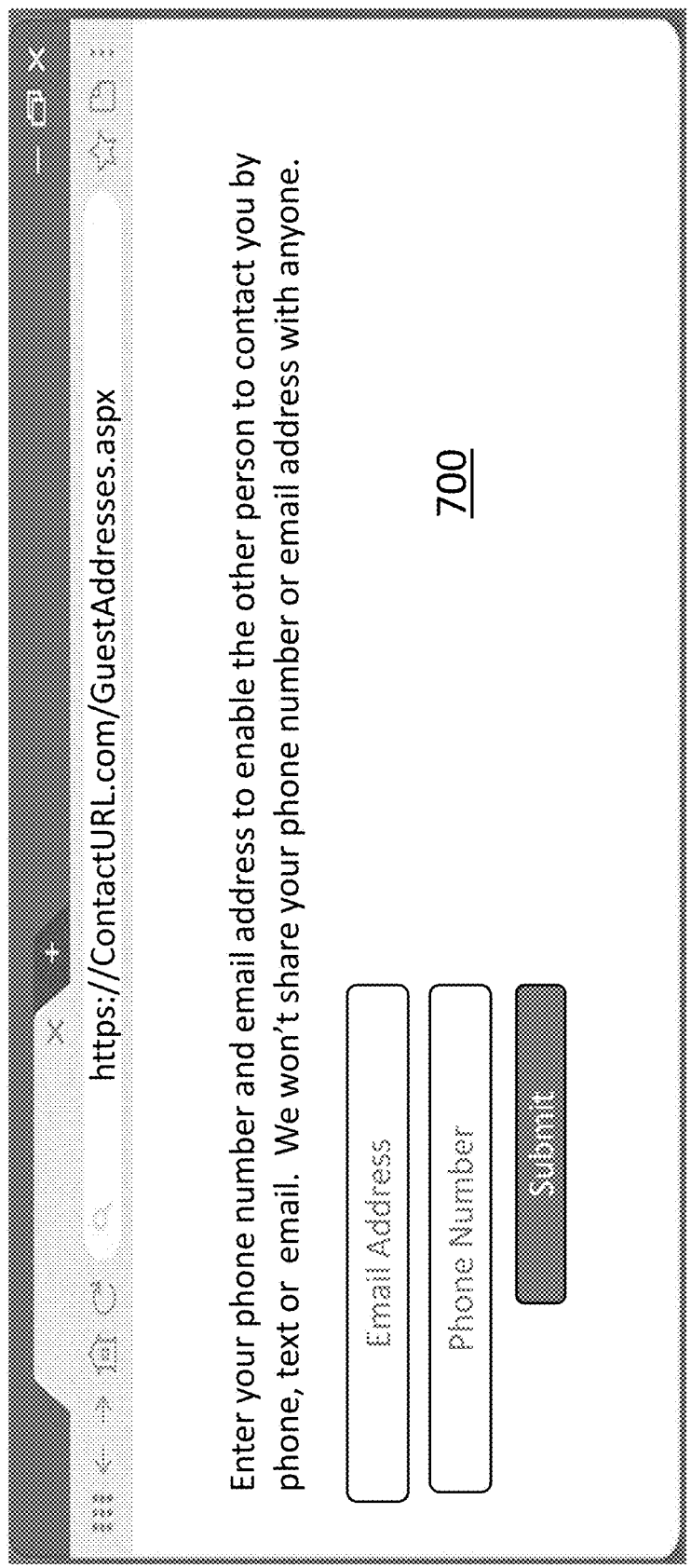
FIG. 7 illustrates a form to prompt a guest to specify communication channels to receive calls or messages from a user.

On the thin client, the guest can click a link that brings up a webform 700, such as shown in FIG. 7. Webform 700 prompts for an email address and/or phone number. The thin client holds the guest's contact addresses and does not disclose them to the subscriber.

Returning to FIG. 6, the interface 600 includes a button 606 to call the subscriber by phone. On clicking the button 606, a call is placed from the web application to both the subscriber and guest phone numbers, and then the web application (i.e., platform) puts both calls into conference so the subscriber and guest can talk.

Thus, the guest can call, text or email the subscriber but never receives the subscriber's phone number or email address. The guest is able to supply contact addresses for reply messages to the thin client, which are not disclosed to the subscriber. The guest can see a history of the conversation across multiple types of communications.

The subscriber can log into the platform and select their conversation with that guest from a list of all their conversations. The subscriber then sees a single-user thin client for communicating with the guest, such as shown in FIG. 8.

The subscriber can place a phone call to the guest, send a text message to the guest, or send an email to the guest without knowing the guest's phone number or email address. Such communications are sent to the guest from a platform no-reply address or phone number so they do not reveal the subscriber's contact information to the guest.

Figure 8:
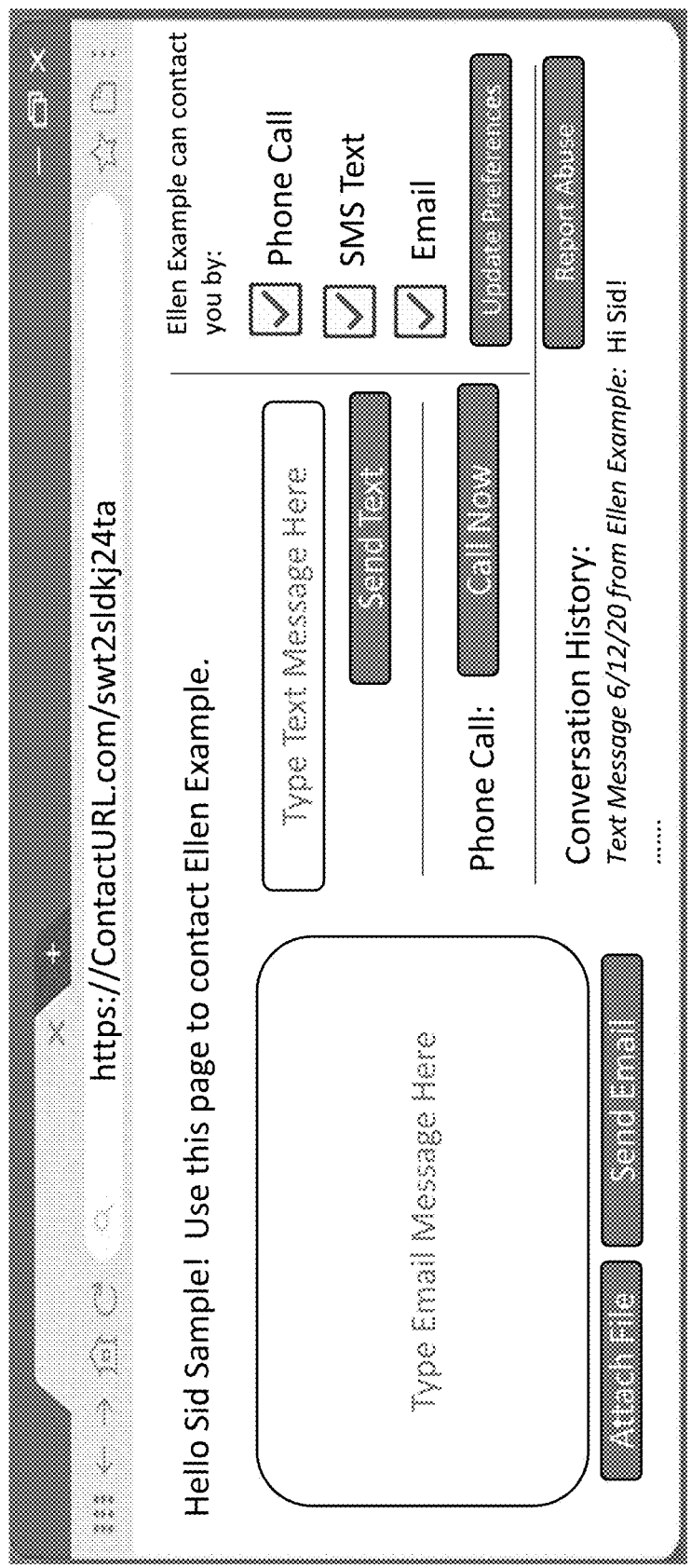
FIG. 8 illustrates a single-user, non-transferrable communications client for a user to communicate with a guest.

The subscriber can add or remove allowed contact types for the guest to use, such as by checking the box on the right side of FIG. 8. For example, a subscriber might remove the phone call and SMS text methods but leave the email method available. The subscriber can remove all contact types to terminate all communications from that guest. Thus, the subscriber controls the configuration of the thin client used by the guest.

The guest can add or remove allowed contact types for the subscriber to use, as shown in FIG. 6. Thus, the guest can limit or cut off further communications from the subscriber because the subscriber is using a thin client whose configuration is controlled by the guest.

The platform also gives users a way to prevent transfer of contact information. The guest user must agree to the platform terms and conditions, which prohibit transfer. A guest user is required to confirm identity (as shown in FIG. 5) before using the communication client, and the client may use additional methods to authenticate the guest such as browser cookies, a username and password, or two-factor authentication.

If someone other than the subscriber's intended guest receives the network link and attempts to use it, they would have to impersonate the guest and assert that they are, in fact, the intended recipient of the network link. Use by anyone other than the guest specified by the subscriber is an unauthorized user of the platform, and such unauthorized use may be punishable by law in many jurisdictions. Unlike the transferee of a PSTN or SMS phone number, or email address, any transferee of a network link issued by the platform would have to engage in criminal behavior to contact the subscriber.

In the same way, a subscriber cannot transfer or sell access to contact the guest. A subscriber must agree to the platform terms and conditions to create a subscriber account. The terms and conditions prevent the subscriber from sharing access to an account. For any other person to access the subscriber account, the other person would have to commit unauthorized use of a computer system, which may be punishable by law in many jurisdictions.

Within the communication client, subscribers and guests can view a history of text messages, emails and phone call data. This combined history is valuable. For example, a negotiation may be conducted over email and text message; and the combined history allows the user to see the latest offer at the top of the history (regardless of how it was sent).

Figure 9:
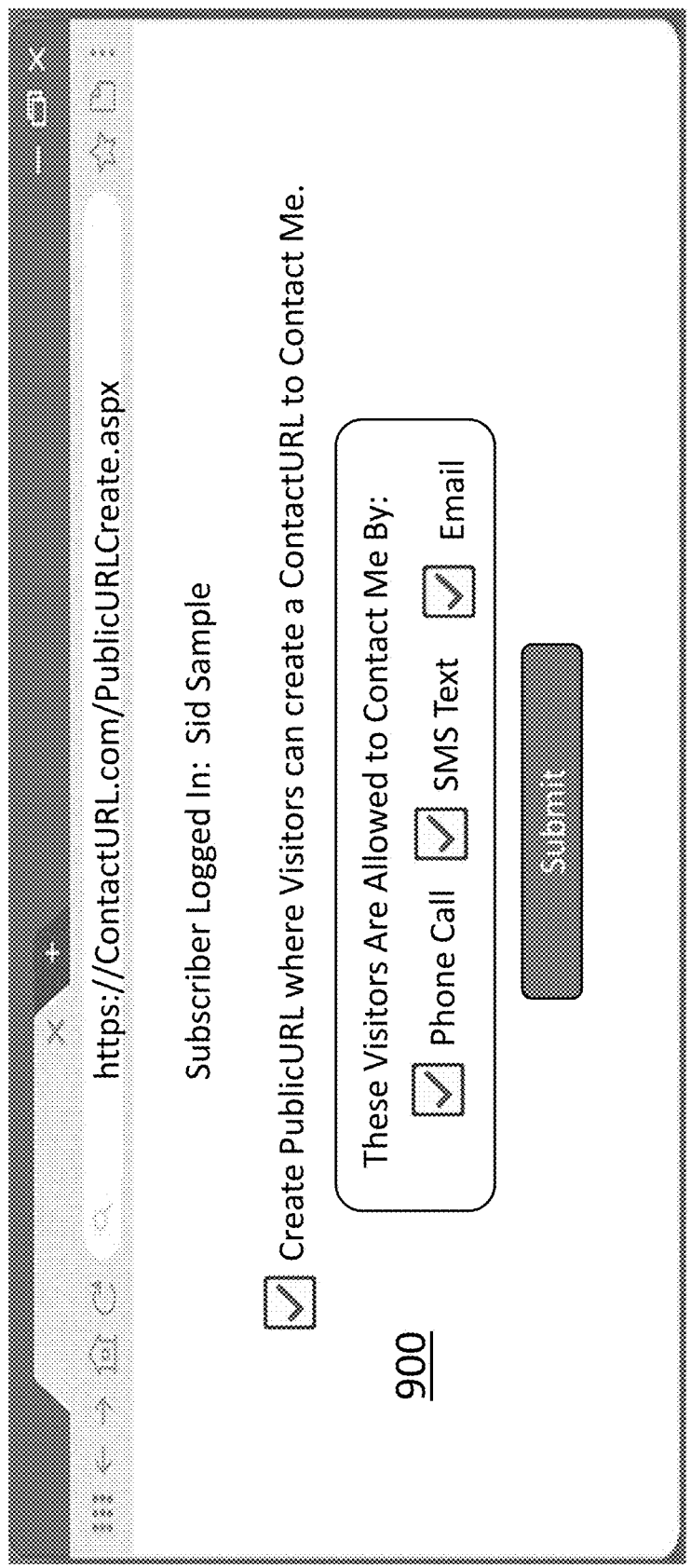
FIG. 9 illustrates a form to establish a publicly available client associated with the user.
Figure 10:
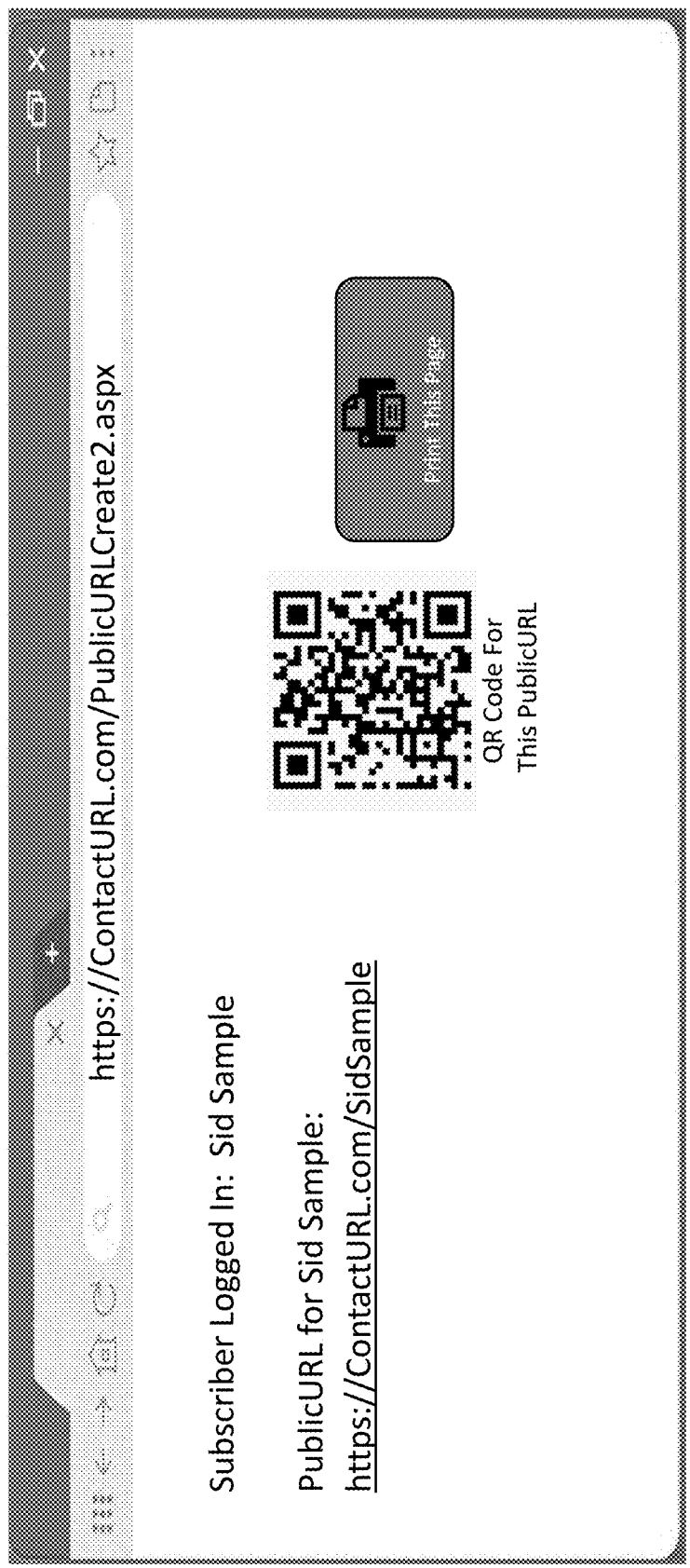
FIG. 10 illustrates an interface displaying a network address for the publicly available client.

A subscriber can create a publicly available client that can then create a unique communication client for each individual that requests to contact the subscriber. FIG. 9 illustrates an interface 900 that generates a PublicURL using the platform website. The subscriber may post the network address, as shown in FIG. 10, to a website, social media profile, or distribute it in other ways.

Figure 11:
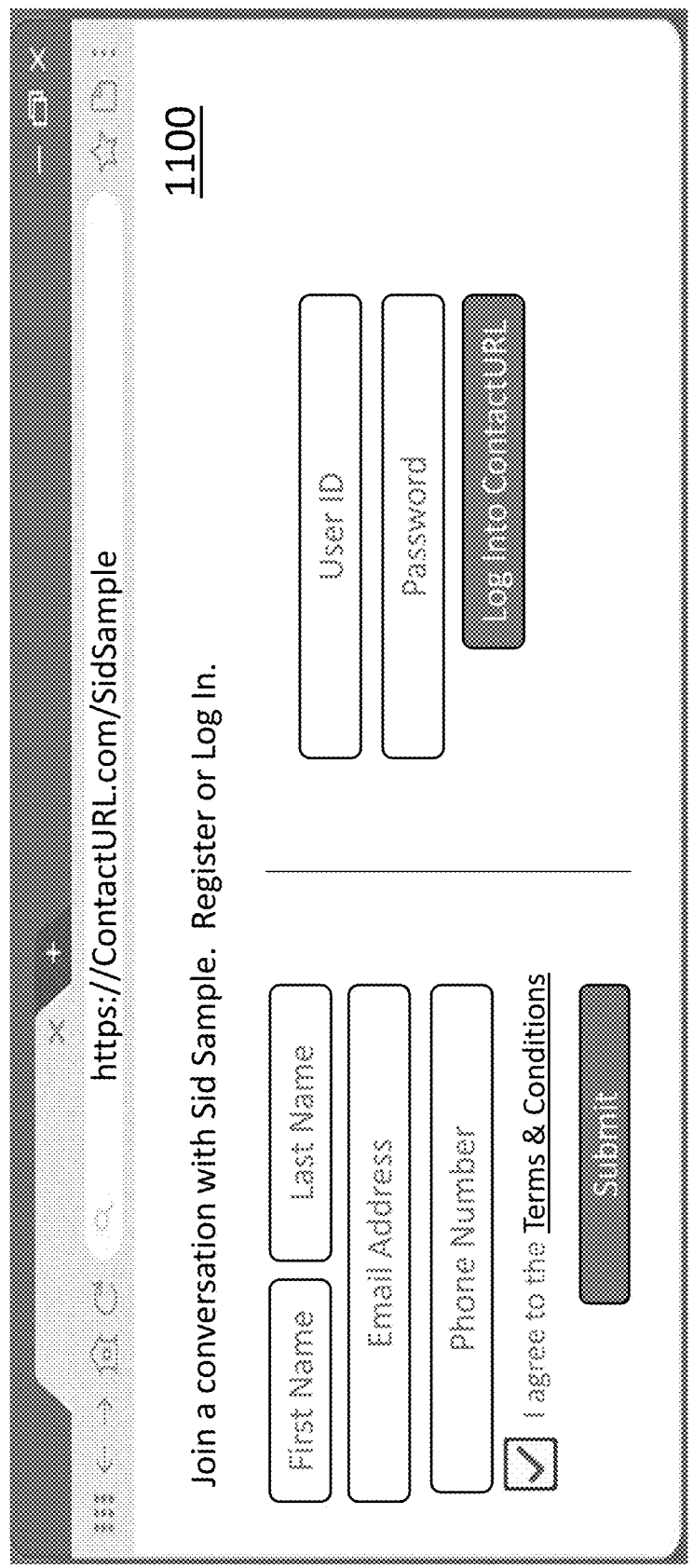
FIG. 11 illustrates the publicly available client with prompts allowing another user to request communications with the associated user.

FIG. 11 illustrates an interface 1100 supplied when a visitor arrives at the network address. The publicly available thin client asks the visitor to register or log in, and may ask for additional validation of identity using methods familiar to those skilled in the art. The thin client will also generate the visitor's reputation score using data including whether other platform users have reported the visitor for abuse.

Figure 12:
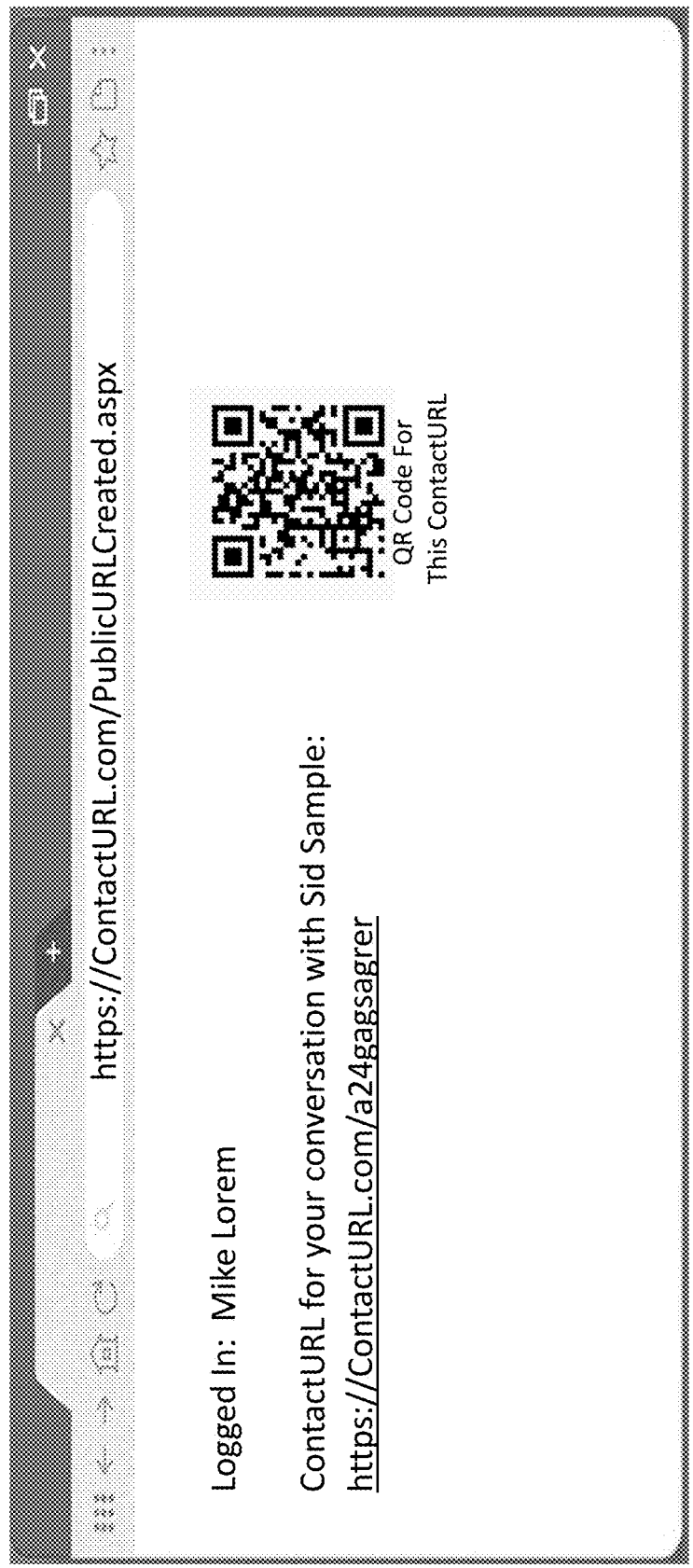
FIG. 12 illustrates the output of the publicly available client, a network address to a single-user, non-transferrable communication client.

Once the visitor's identity is determined and the visitor's reputation score is determined to be acceptable, the publicly available thin client generates a communication thin client for the visitor's conversation with the subscriber, such as shown in FIG. 12. From this point, the visitor can use the communications thin client as described earlier. The publicly available client also generates a communications thin client for the subscriber to use in communicating with the visitor, which operates as described earlier.

Because the public network address process obtains a verified identity for the visitor, people who a subscriber blocks (by removing all contact methods) stay blocked. The publicly available thin client does not allow the same visitor to generate a different communication client later to re-start the conversation with the subscriber.

The platform stores subscriber identification and contact method data by individual. Each subscriber has a unique identity captured at the time of registration, such as a first name, a last name, a phone number and an email address. In one embodiment, visitors are required to become a subscriber before using a public network address, so they are identified as a unique individual and have data stored as described above.

A subscriber may participate in many conversations, including conversations with guests and with other subscribers. The data for a conversation specifies which users are included in the conversation, such as a subscriber and a guest or two subscribers. The conversation data also includes a conversation history, with the content and relevant metadata of messages sent or communications initiated. This may include the text and send date of emails and text messages, the date and duration of phone calls, and an automatically generated transcript of phone calls. The conversation data also includes each participant's preferences for how others in the conversation may contact them. For example, a participant may only wish to be contacted by email, and not by phone call or text message.

A guest UserID is created when the guest first accepts an invite from a subscriber. If a guest accepts a second invitation to the same conversation, such as accepting a text message invitation after accepting an email invitation, no new GuestID is created. The guest's first name and last name are specified by the subscriber (as shown in FIG. 2) or by the guest (as shown in FIG. 4). The guest may optionally add (as shown in FIG. 7) an email address and/or phone number to the platform.

An individual may have multiple guest user identities and participate as a guest in multiple conversations. This occurs because the platform does not require the subscriber to determine a unique guest identity and does not require the guest to prove a unique identity to join a conversation.

It is still true that each communication client used by a guest is a single-user, non-transferrable communication client. No other individual may use it, and it may not be transferred to another individual. The proliferation of GuestID's under one individual is a problem the current embodiment of the platform accepts for the sake of simplifying the invite creation and acceptance process.

The platform also stores all invitations created by a subscriber or by the public network address client. Each invite specifies the conversation and the creator/sender. If the invite is sent by email or text message, the invite stores the contact address the invite was sent to. Invites are classified as active or expired, and they can be expired based on subscriber input or automated rules. One conversation can have many invitations. For example, a subscriber may invite a guest by email and by text message. These are two distinct invitations with different URL's although they are sent to the same guest.

Contact methods stored under a SubscriberID or GuestID are marked as validated or not validated. Subscribers or guests may validate a contact method by clicking on a unique link sent by text message (to validate a phone number) or email (to validate an email address). The unique link may be sent as part of the registration process or the invite process. Additional ways to validate contact addresses are known to those skilled in the art and may also be used.

The current embodiment of the platform uses two-person conversations. However, the data structure is created to allow for conversations with three or more participants, which would require straightforward changes to the user interface such as adding a step for a subscriber to specify a second guest and send a second set of invitations. In a multiparty conversation, the recipient of a call or message would still control the configuration of the single-user, non-transferrable communication clients used by the other participants by storing settings at the conversation level.

Figure 13:
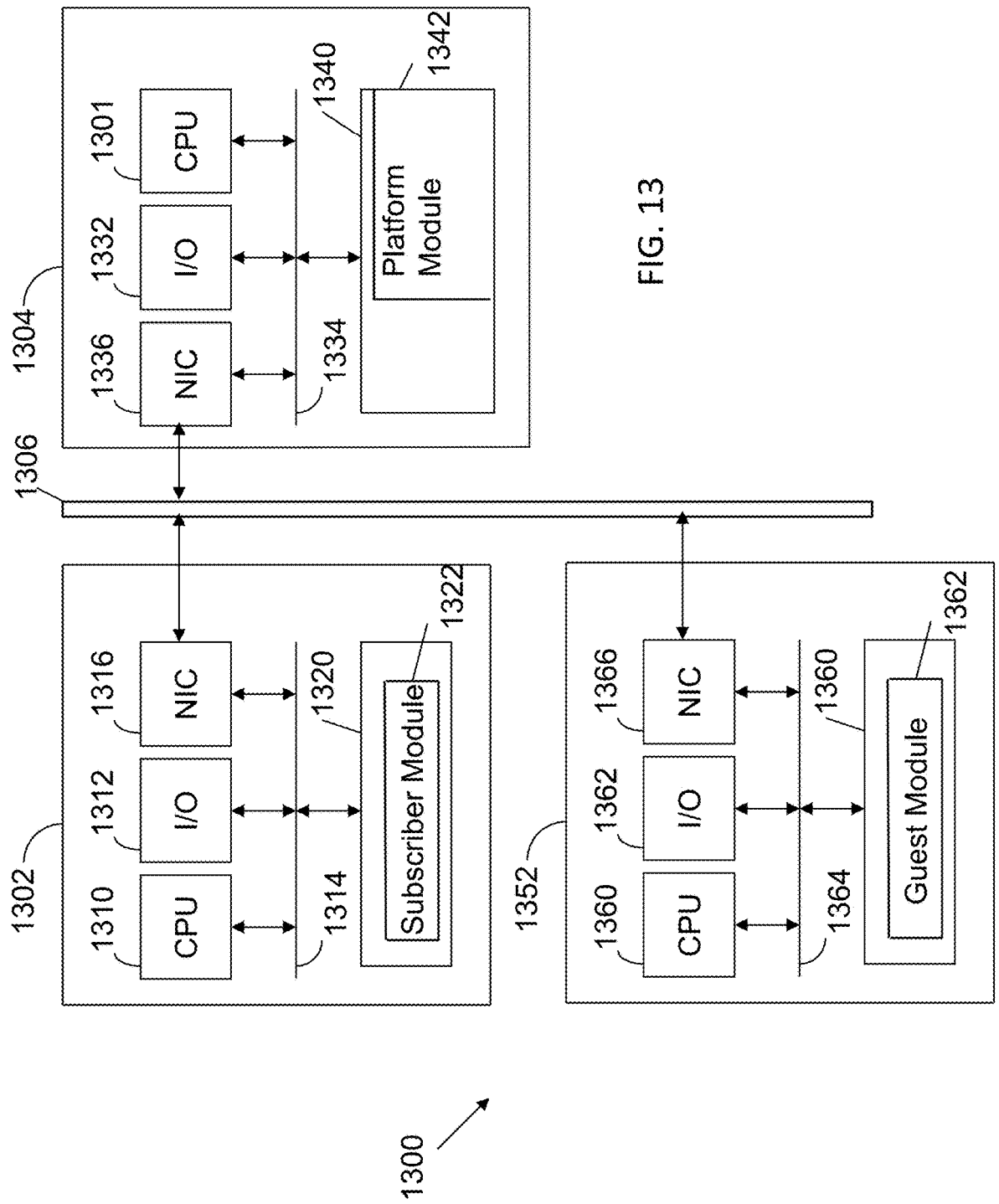
FIG. 13 illustrates a system configured in accordance with an embodiment of the invention.

FIG. 13 illustrates a system 1300 configured in accordance with an embodiment of the invention. The system 1300 includes a subscriber machine 1302 in communication with a platform machine 1304 via a network 1306, which may be any combination of wired and wireless networks. The subscriber machine 1302 is operated by a first user or subscriber to the platform. The platform machine 1304 is a server to implement the communication operations disclosed herein between a first user and a second user. Guest machine 1352 is also connected to network 1306. The guest machine 1352 is operated by a second user or platform guest.

The subscriber machine 1302 includes a processor (e.g., central processing unit 1310) connected to input/output devices 1312 via a bus 1314. A network interface circuit 1316 is also connected to bus 1314 to provide connectivity to network 1306. A memory 1320 is also connected to the bus 1314. The memory 1320 includes instructions executed by processor 1310. More particularly, the memory 1320 stores a subscriber module 1322 with instructions executed by processor 1310 to implement the first user or subscriber operations disclosed herein, including rendering different sender interfaces disclosed herein.

The platform machine 1304 includes a processor 1301, input/output devices 1332, a bus 1334 and a network interface circuit 1336. A memory 1340 is connected to the bus 1334. The memory 1340 stores a platform module 1342 with instructions executed by processor 1301 to implement the platform operations disclosed herein. These operations include maintaining different non-transferrable communication clients for selective subscribers and guests, hosting publicly available clients, bridging communication channels (e.g., transforming a message from a text communication format to an email communication format), and other operations disclosed in accordance with embodiments of the invention.

The guest machine 1352 includes a processor 1360, input/output devices 1362, a bus 1364 and a network interface circuit 1366. A memory 1360 is connected to bus 1364. The memory 1360 stores a guest module 1362 with instructions executed by processor 1360 to implement guest operations disclosed herein, including rendering different guest interfaces disclosed herein.

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hard-wired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A non-transitory computer readable storage medium with instructions executed by a processor to:

supply prompts from a communication platform to a first machine via a network to register a first user with the communication platform;

supply prompts from the communication platform to the first machine via the network to the first user to specify a second user and public network communication constraints;

create a network address to a single-user, non-transferrable communication client that enforces the public network communication constraints and is hosted by the communication platform;

supply prompts from the communication platform via the network to a second machine associated with the second user, allowing the second user to send a second user message through the single-user, non-transferrable communication client;

receive at the communication platform via the network the second user message; and send the second user message to the first user via a selected public network allowed by the single-user, non-transferrable communication client.

2. The non-transitory computer readable storage medium of claim 1, wherein the communication constraints specify permissible public network communication channels.

3. The non-transitory computer readable storage medium of claim 2, wherein the permissible public network communication channels are one or more of a packet-switched telephone network, a Short Message Service (SMS) text network, and an email network.

4. The non-transitory computer readable storage medium of claim 1, further comprising instructions executed by the processor to confirm identity of the second user.

5. The non-transitory computer readable storage medium of claim 1, further comprising instructions executed by the processor to prompt the second user for agreement to specified terms and conditions associated with the communication platform.

6. The non-transitory computer readable storage medium of claim 1, further comprising instructions executed by the processor to create a second single-user, non-transferrable communication client that enforces second communication constraints set by the second user for the first user to communicate with the second user.

7. The non-transitory computer readable storage medium of claim 1, wherein the communication constraints enforced by the single-user, non-transferrable communication client dictate that all communications between the first user and the second user are arbitrated by the communication platform such that first user public network address information is never shared with the second user and second user public network address information is never shared with the first user.

8. The non-transitory computer readable storage medium of claim 1, further comprising instructions executed by the processor to create a network address to a publicly available client associated with the first user, hosted on the communication platform, which supplies prompts allowing another user to create a single-user, non-transferrable communication client to communicate with the first user via the public network.

9. The non-transitory computer readable storage medium of claim 1, further comprising instructions executed by the processor to maintain at the communication platform a history of communication sessions between the first user and the second user.

10. The non-transitory computer readable storage medium of claim 1, further comprising instructions executed by the processor to maintain at the communication platform reputation scores for the first user and the second user.

* * * * *